(12) United States Patent
Xu et al.

(10) Patent No.: US 10,097,077 B2
(45) Date of Patent: Oct. 9, 2018

(54) CONTROL METHOD FOR IMPROVING DYNAMIC RESPONSE OF SWITCH POWER

(71) Applicant: SOUTHEAST UNIVERSITY, Nanjing (CN)

(72) Inventors: Shen Xu, Nanjing (CN); Chong Wang, Nanjing (CN); Xianjun Fan, Nanjing (CN); Weifeng Sun, Nanjing (CN); Shengli Lu, Nanjing (CN); Longxing Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 15/751,136

(22) PCT Filed: Jan. 29, 2016

(86) PCT No.: PCT/CN2016/072693
§ 371 (c)(1),
(2) Date: Feb. 7, 2018

(87) PCT Pub. No.: WO2017/028500
PCT Pub. Date: Feb. 23, 2017

(65) Prior Publication Data
US 2018/0234007 A1  Aug. 16, 2018

(30) Foreign Application Priority Data
Aug. 14, 2015 (CN) .......................... 2015 1 0502980

(51) Int. Cl.
| | | |
|---|---|---|
| G05F 1/70 | (2006.01) | |
| G05F 1/00 | (2006.01) | |
| A61B 17/32 | (2006.01) | |
| B41J 2/00 | (2006.01) | |
| H02M 3/158 | (2006.01) | |

(Continued)

(52) U.S. Cl.
CPC ............ *H02M 1/08* (2013.01); *G05B 19/042* (2013.01); *G05B 2219/2639* (2013.01); *H02M 2001/0048* (2013.01)

(58) Field of Classification Search
CPC ............ H02M 1/08; H02M 2001/0048; G05B 19/042; G05B 2219/2639
USPC ..... 327/108–112, 379, 389, 391; 326/22–27, 326/81–87
See application file for complete search history.

(56) References Cited

U.S. PATENT DOCUMENTS 9,379,621 B1 * 6/2016 Kalyanaranman ........................... H02M 3/33507
2001/0043450 A1 * 11/2001 Seale ........................ F01L 9/04
361/160

(Continued)

*Primary Examiner* — Brandon S Cole
(74) *Attorney, Agent, or Firm* — CBM Patent Consulting, LLC

(57) ABSTRACT

A control method for improving dynamic response of switch power is based on a closed-loop control system comprising a sampling module, a dynamic control module, an error calculation module, a PID module, a mode control module, and a PWM module. The sampling module samples an output voltage Vo, and the dynamic control module compares the output voltage Vo with a set maximum voltage Vomax, a set minimum voltage Vomin, and a reference voltage Vref, so as to determine whether to adopt a dynamic mode. In the dynamic mode, when the output voltage Vo changes greatly, the output voltage Vo is rapidly restored to a stable voltage by inputting large power or small power.

1 Claim, 13 Drawing Sheets

(51) Int. Cl.
*H02M 1/08* (2006.01)
*G05B 19/042* (2006.01)
*H02M 1/00* (2006.01)

(56) References Cited

U.S. PATENT DOCUMENTS

| | | | |
|---|---|---|---|
| 2006/0290770 A1* | 12/2006 | LeBlanc | B41J 2/37 347/188 |
| 2014/0350742 A1* | 11/2014 | Matan | H02J 3/18 700/297 |
| 2015/0157354 A1* | 6/2015 | Bales, Jr. | B06B 1/0223 606/169 |
| 2015/0340952 A1* | 11/2015 | Manohar | H02M 3/158 323/271 |

\* cited by examiner

CONTROL METHOD FOR IMPROVING DYNAMIC RESPONSE OF SWITCH POWER

This application is the U.S. national phase of International Application No. PCT/CN2016/072693 filed on 29 Jan. 2016 which designated the U.S. and claims priority to Chinese Application No. CN201510502980.X filed on 14 Aug. 2015, the entire contents of each of which are hereby incorporated by reference.

TECHNICAL FIELD

The present invention relates to switch power, and more particularly, to a control method for improving dynamic response of switching power supply

BACKGROUND

Switch power is usually used as a power supply for all types of electric equipment, to play a role of converting an unadjusted AC or DC input voltage into an adjusted AC or DC output voltage. Since the switch power needs to adapt to different working conditions, the performance requirements on the dynamic response of the power are higher and higher. Good dynamic effects require small voltage changes and the voltage recovery time. For example, in the application of home appliances, the power load of a washing machine changes quickly and greatly, so that overvoltage and undervoltage are introduced into the output voltage of the power, and when the overvoltage and undervoltage are too large, the load damage to the washing machine is relatively larger; in addition, in mobile phone charging, when a charger is standby and the mobile phone is loaded suddenly, the output voltage is reduced, and when the voltage is reduced under the normal voltage of a battery, there is a certain damage to the battery. Therefore, the dynamic performance needs to be increased.

In present power management, in order to enable the power to have higher efficiency, a multi-mode control method is selected in the power generally, but the multi-mode control method will cause the problem of decreasing the dynamic performance. A flyback converter of 5V and 1 A is taken as an example in the following; when the load power consumption is reduced, a switch frequency will be decreased usually so as to reduce the circuit losses. It is defined that load A is a 1 A load, the switch frequency $f_A$ is 70 kHz, and the circuit has higher efficiency. Load B is a 0.7 A load, and the switch frequency $f_B$ is 70 kHz. Load C is a 0.2 A load, and the switch frequency $f_C$ is 20 kHz. Load D is a 0.05 A load, and the switch frequency $f_D$ is 20 kHz. The switch frequency at the load point is selected according to the system efficiency requirements. When the load is between A and B, a PWM mode is adopted, when the load is between B and C, a PFM mode is adopted, when the load is between C and D, the PWM mode is adopted and is donated as a DPWM mode, when the load is less than the load D, the PWM mode is adopted and is donated as the DPFM mode, and the working modes of the loads from light to heavy are DPFM-DPWM-PFM-PWM. If the load is standby, according to the size of a dummy load, assuming that a standby frequency is 2 kHz, and the control mode at the moment is the DPFM mode; if the load is suddenly changed into full load, and the output voltage is decreased at a very quick speed, according to a supplementary result, a control mode will pass through the DPWM, PFM and PWM modes respectively; when the supplementary result does not reach the full load condition, the output voltage is continuously decreased, which may cause severe voltage drop that is unbearable in some cases; and similarly, when the full load is switched into a light load, an intermediate mode control process will cause the continuous increase of the voltage, and the voltage will have a great overshoot. Moreover, in some cases, in order to prevent the control mode from being repeatedly switched between two modes near a switching point during mode switching, it needs to go through several cycles to confirm the need to switch the mode control when switching from one mode to another mode; under such condition, the dynamic effect will be further reduced.

In addition, in some controls, the sampling can only be conducted once in one cycle. For example, in a flyback power with primary feedback, the output voltage can only be sampled before the secondary current drops to zero. In this way, when the load is switched from light to heavy, the switch frequency of the DPWM is low, and even if the PI adjustment is very large, the dynamic process is slower for stability.

Moreover, in order to accelerate the dynamic response speed, some control methods can increase PI parameters to accelerate the supplementation, so as to increase the dynamic effects, but the improvement to increase the dynamic performances under the multi-mode control is not great.

Therefore, due to the increasingly high dynamic performance requirements and the dynamic problems brought by the multi-mode control method, a control method for improving dynamic response of switch power is proposed. The control method has very good effects on decreasing the overshoot and undervoltage of the voltage and decreasing the dynamic recovery time, which is very necessary for increasing the dynamic performance of the circuit.

SUMMARY

In order to overcome the limitations and defects of the prior art, the present invention proposes a control method for improving dynamic response of switch power, which can limit the overshoot and undervoltage of the output voltage within a certain range, reduce the dynamic recovery time and improve the dynamic performance, and will not cause system instability in multi-mode control, making the dynamic performances of circuit design better.

In order to achieve the above objects, the technical solution adopted by the present invention is as follows.

A control method for improving dynamic response of switch power is based on a control system comprising a sampling module, a dynamic control module, an error calculation module, a PID module, a mode control module, and a PWM module, and the control system is connected to the controlled switch power to form a closed loop.

The sampling module comprises a sampling circuit and a sampling calculation module, the sampling circuit outputs a partial voltage through the switch power to obtain the information of the output voltage, and the sampling calculation module calculates a signal Vo of the size of the output voltage according to the result of the sampling circuit.

The dynamic control module comprises a voltage monitoring module and a slope calculation module; the voltage monitoring module receives a sampling result Vo outputted by the sampling module and determines whether to adopt a dynamic mode according to the relationship between Vo and a set maximum voltage Vomax, a set minimum voltage Vomin, and a reference voltage Vref respectively, wherein Vomin<Vref<Vomax; the dynamic mode means that when the output voltage Vo changes greatly, the output voltage Vo is rapidly restored to a stable voltage by inputting large power or small power, and the dynamic mode comprises a constant-frequency light-to-heavy load LTH mode and a constant-frequency heavy-to-light load HTL mode.

The voltage monitoring module outputs a mode selection result mode_F to the mode control module and the slope calculation module, if the voltage monitoring module determines that the system enters the dynamic mode, the slope calculation module calculates a voltage change slope; if the system enters a normal working mode, output latch of the slope calculation module is controlled to be unchanged; the slope calculation module calculates the rising slope of Vo when the voltage monitoring module outputs the LTH mode, and calculates the descending slope of Vo when the voltage monitoring module outputs the HTL mode; when the normal working mode is adopted, the slope calculation module does not calculate the slope, and the slope Kslope keeps unchanged; and the result Kslope of the slope calculation module is outputted to the mode control module.

The voltage monitoring module comprises three comparators COMP1, COMP2 and COMP3, and a logical unit, the positive terminal of the comparator COMP1 is connected to the set maximum voltage Vomax, and the negative terminal of the comparator COMP1 is connected to Vo; the positive terminal of the comparator COMP2 is connected to Vo, and the negative terminal of the comparator COMP2 is connected to the set reference voltage Vref; the positive terminal of the comparator COMP3 is connected to Vo, the negative terminal of the comparator COMP3 is connected to the set minimum voltage Vomin, and the logical unit outputs one of the LTH mode, the HTL mode and the normal mode according to the results of the three comparators.

When Vo is less than the minimum voltage Vomin, the logical unit outputs the constant-frequency light-to-heavy load LTH mode in the dynamic mode to enable the output to be rapidly raised to the reference voltage Vref by inputting large power and then jump out of the mode and enter the normal mode, and the initial state of the normal mode is set by the mode control module.

When Vo is greater than the maximum voltage Vomax, the logical unit outputs the constant-frequency heavy-to-light load HTL in the dynamic mode to enable the output to be rapidly dropped to the reference voltage Vref by inputting small power and then jump out of the mode and enter the normal mode, and the initial state of the normal mode is set by the mode control module.

If Vo does not change greatly, the dynamic mode is not needed, and loop control is realized through normal PI control method and mode control, which is called normal working mode.

When Vo is between Vomin and Vref, if the logical unit outputs the LTH mode in last period, then the LTH mode is outputted in the period; if the output of the logical unit is the HTL mode in last period, then the output of the logical unit is the normal mode in the period; if the output of the logical unit is the normal mode in last period, then the output of the logical unit is the normal mode in the period; when Vo is between Vref and Vomax, if the output of the logical unit is the LTH mode in last period, then the output of the logical unit is the normal mode in the period; if the output of the logical unit is the HTL mode in last period, then the output of the logical unit is the HTL mode in the period; and if the output of the logical unit is the normal mode in last period, then the output of the logical unit is the normal mode in the period.

The inputs of the slope calculation module are the sampling result Vo and the output mode_F of the voltage monitoring module, when the mode_F is the LTH mode, the rising slope Kup of Vo is calculated, and the voltage changes of N1 LTH mode switch periods are used for equivalency replacement, i.e., Kup=Vo(n)−Vo(n−N1), wherein Vo(n) is the sampling result of the current period, Vo(n−N1) is the sampling result before N1 periods, and Kup is the size of the result Kslope outputted from the slope calculation module; when the mode_F is the HTL mode, the descending slope Kdown of Vo is calculated, the voltage changes of N2 HTL mode switch periods are used for equivalency replacement, i.e., Kdown=Vo(n−N2)−Vo(n), wherein Kdown is the size of Kslope outputted; and when the mode_F is the normal mode, the slope calculation module does not work, and the output result Kslope keeps unchanged through latching.

The input of the error calculation module is Vo outputted from the sampling module, and the difference of subtracting the output voltage Vo from the reference voltage Vref is the current sampling error, which is donated as e1, and outputted to the PID module.

The inputs of the mode control module are the output mode_F of the voltage monitoring module, the output Kslope of the slope calculation module and the calculation result $V_{PI}$ of the PID module respectively; when the output mode_F of the voltage monitoring module is the dynamic mode, the mode control module switches off the PID module through outputting a control signal PI_ctrl, and controls the PWM module to receive the switching period $T_{s\_LTH}$ or $T_{s\_HTL}$ of the dynamic mode and duty ratio $D_{LTH}$/current or $D_{HTL}$/current information outputted by the mode control module, and the PWM module generates a duty ratio waveform at the moment according to the $T_{s\_LTH}$ or $T_{s\_HTL}$ of the dynamic mode, and the duty ratio $D_{LTH}$/current or $D_{HTL}$/current information; when the mode control module jumps out of the dynamic mode to enter a first switch period of the normal working mode, the mode control module obtains the size of a corresponding output load according to the size of the slope Kslope of the slope calculation module at the moment, the PID module is started through the control signal PI_ctrl and $V_{PI0}$ is assigned to the current sampling result before PID calculation, $V_{PI0}$ is the output value of the PID module corresponding to the load in a stable state after change, the PID module conducts PID calculation according to the error outputted by the error module after the assignment, and a PID calculation result $V_{PI}$ is fed back to the mode control module to conduct mode selection and control in the normal working mode; when the mode control module jumps out of the dynamic mode to enter a second switch period of the normal working mode and later, the PID module is started by PI_ctrl to conduct calculation, the PID module conducts PID calculation according to the error outputted by the error module, the calculation result $V_{PI}$ is fed back to the mode control module to conduct mode selection and control in the normal working mode, the PWM module receives a supplementary result $V_{PI}$ outputted by the PID and the control mode of the normal working mode given by the mode control module in the normal working mode, the control mode is donated as mode_ctrl, the switch period and the duty ratio/current information is obtained through calculation, and the PWM module generates the duty ratio waveform according to the switch period and a duty ratio signal at the moment.

The inputs of the PID module are an error signal e1 outputted by the error calculation module, the control signal PI_ctrl outputted by the mode control module and the $V_{PI0}$ assigned; in the dynamic mode, when the PID module is switched off, the dynamic mode is switched to the first switch period of the normal working mode, an initial value $V_{PI0}$ is assigned to the calculation of the PID module firstly, then PID calculation is conducted, the supplementary calculation result $V_{PI}$ is outputted to the mode control module and the PWM module, then PID calculation is conducted to each period of the normal working mode, and the supplementary result $V_{PI}$ is outputted to the mode control module and the PWM module.

The inputs of the PWM module are the PI_ctrl control signal outputted by the mode control module, the switch period $T_{s\_LTH}$ or $T_{s\_HTL}$ and the duty ratio $D_{LTH}$ or $D_{HTL}$ of the LTH and HTL modes, the control mode result mode_ctrl of the mode control module in the normal working mode, and the supplementary result $V_{PI}$ of the PID module; the switch period and the duty ratio information in normal control are obtained by calculating through the supplementary result $V_{PI}$ of the PID module and a control mode mode_ctrl signal of the normal working mode given by the mode control module, after the period and the duty ratio/peak current information are obtained, the duty ratio waveform is outputted through a driving circuit to realize the loop control on the grid of a power valve of the switch power; and then the output voltage of the switch power is sampled again, and the process above is repeated to conduct cycle control to switch on and off the power valve of the switch power, so as to make the system be more stable, thus obtaining higher dynamic response.

The advantages and remarkable effects of the present invention are as follows.

1. The dynamic control method proposed by the present invention can output quickly and stably by means of heavy-to-light load mode with small energy when the output voltage exceeds the maximum voltage, and can output quickly and stably by means of light-to-heavy load mode with high energy when the output voltage is lower than the minimum voltage; when the load is switched, the change of the output voltage is limited between the maximum voltage and the minimum voltage, so that the voltage change is greatly reduced and the dynamic recovery time is greatly decreased.

2. The dynamic control method proposed by the present invention calculates the slopes of the output voltage changes in the heavy-to-light load mode and the light-to-heavy load mode and obtains the size of the loads according to the one to one monotonicity relationship between the slopes and the loads. After jumping out of the above two modes, it jumps to the working state of the corresponding load point, and the energy and the steady-state load consumption after transitioning are not much different, eliminating the subsequent voltage oscillation and decreasing the dynamic recovery time. In addition, using the slope to determine the size of the load after jumping out can avoid large voltage resonance caused by the large difference between the steady-state consumptions of the energy and the load after transitioning, which eliminates the oscillation generated when the heavy-to-light load mode or the light-to-heavy load mode changes to the normal control mode. The power supply will be more stable.

3. The present invention is added with two working modes including the heavy-to-light load mode and the light-to-heavy load mode, and the method of determining the working points by the slope, which does not affect the stability of a general multi-mode designed loop.

4. The present invention can improve the flexibility of the circuit design. Due to the relationship between the slope and the mode time of the heavy-to-light load mode and the light-to-heavy load mode, the mode time can replace the function of the voltage slope; both the voltage slope and the mode time can be applied in analog design and digital design, making the application control be wider and improving the dynamic response of the circuit.

5. The present invention can be applied to various switch power circuit structures, and has universality, reusability and portability.

BRIEF DESCRIPTION OF THE DRAWINGS

FIG. 1b is a structure block diagram of a voltage monitoring module in FIG. 1a; and FIG. 1c is a structure block diagram of a slope calculation module in FIG. 1a;

DETAILED DESCRIPTION

Figure 1A:
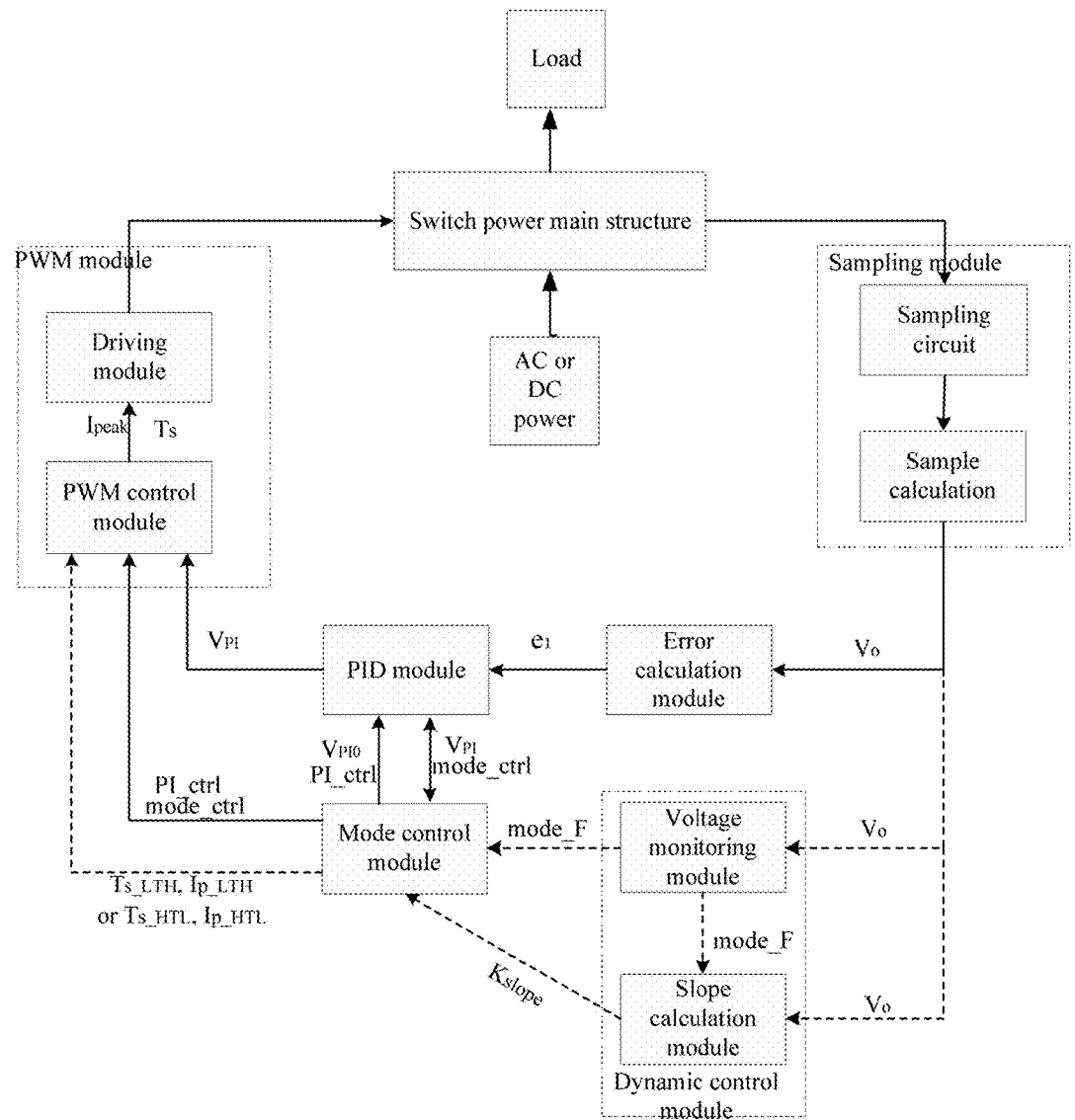
FIG. 1a is a structure block diagram of a system of a control method according to the present invention.
Figure 1B:
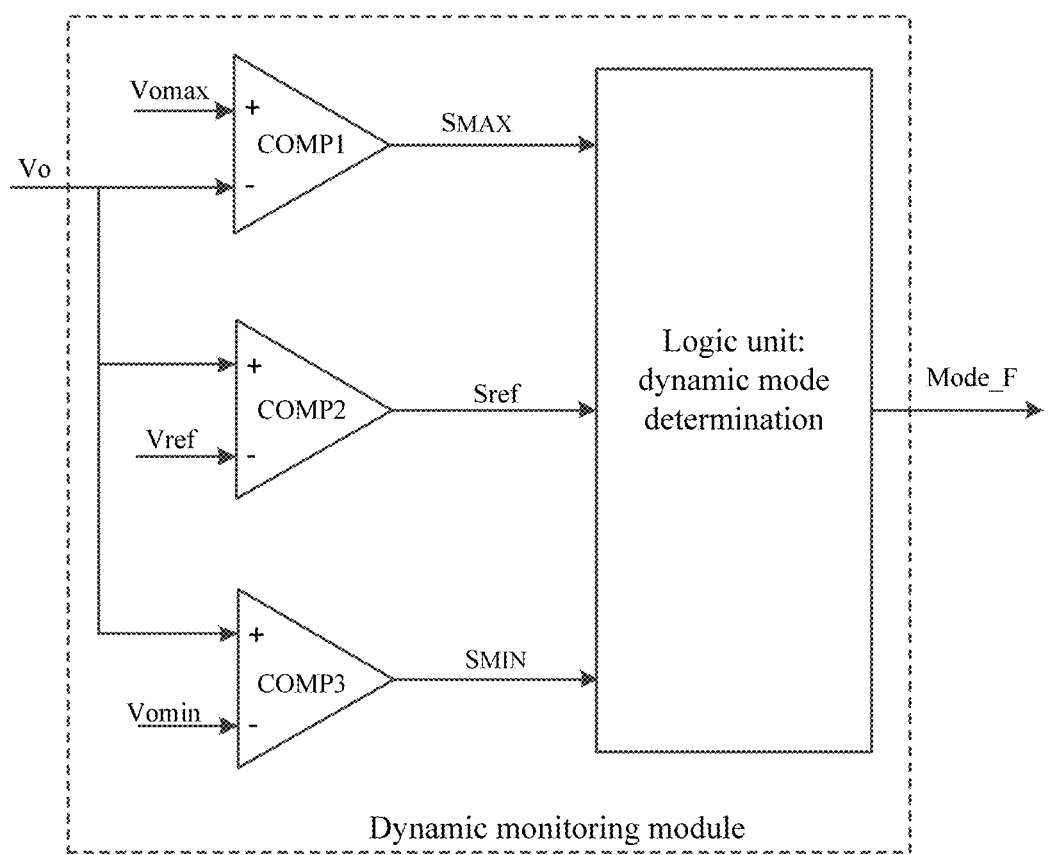
Figure 1C:
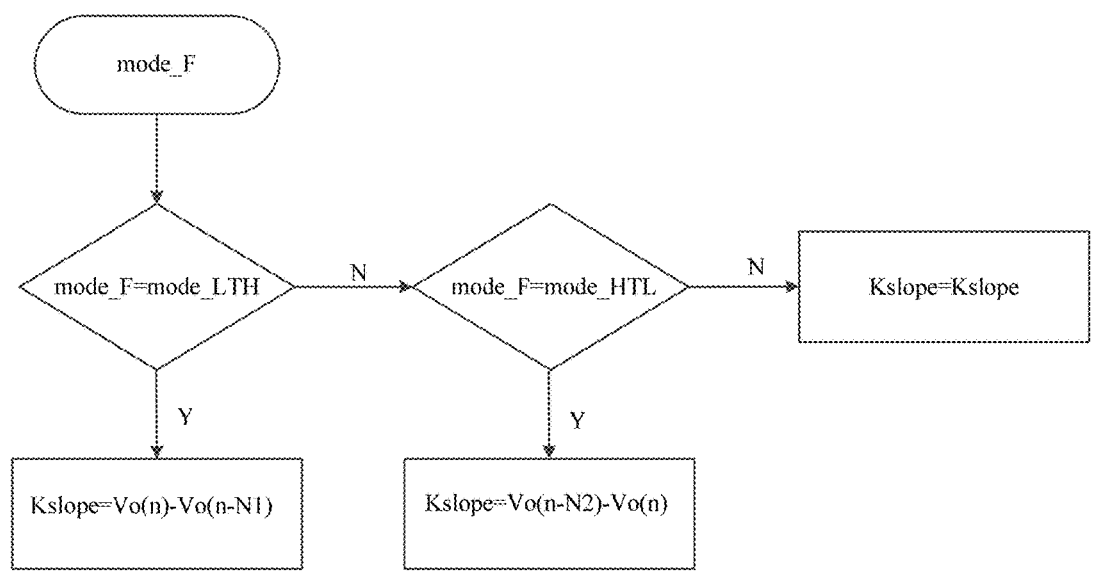

Referring to FIG. 1, solid arrows are signal flows used by a control loop in a normal working mode, and dotted arrows and solid arrows are signal flows in a control loop in a dynamic mode.

A control method for improving dynamic response of switch power according to the present invention is based on a control system comprising a sampling module, a dynamic control module, an error calculation module, a PID module, a mode control module, and a PWM module, and the control system is connected to the controlled switch power to form a closed loop.

A sampling circuit in the sampling module samples the output voltage of the switch power to obtain the information of the output voltage information and input the information of the output voltage to the sampling calculation module, and the sampling calculation module obtains a signal Vo of the size of the output voltage according to a sampling algorithm, then the current sampling voltage Vo is inputted to the dynamic control module and the error calculation module, and the error calculation module calculates a current voltage error.

The dynamic control module comprises a voltage monitoring module and a slope calculation module. The voltage monitoring module determines whether to adopt the dynamic mode according to the sampling result Vo. The so-called dynamic mode refers to that when the voltage of a load changes greatly, and a maximum voltage Vomax and a minimum voltage Vomin are set here, when Vo is greater than Vomax or Vo is less than Vomin, it is deemed that the voltage changes greatly, and it is necessary to make the output voltage be restored to a stable voltage rapidly by inputting large power or small power; and when the output voltage is less than the minimum voltage Vomin, a constant-frequency light-to-heavy load mode (LTH) in the dynamic mode is introduced to enable the output to be rapidly raised to the reference voltage Vref by inputting large power and then jump out of the mode; when the output voltage is greater than the maximum voltage Vomax, a constant-frequency heavy-to-light load mode (HTL) in the dynamic mode is introduced to enable the output to be rapidly dropped to the reference voltage Vref by inputting small power and then jump out of the mode; on the contrary, if the output voltage changes suddenly, but does not change greatly, the dynamic mode is not needed, and loop control is realized through normal PI control method and mode control, which is called normal working mode. A mode result (mode_F) outputted by the voltage monitoring module is inputted to the mode control module and the slope calculation module, if the voltage monitoring module determines that the system enters the dynamic mode, and if the system enters the normal working mode, output latch of the slope calculation module is controlled to be unchanged. The slope calculation module calculates the rising slope of Vo when the voltage monitoring module outputs the LTH mode, and calculates the descending slope of Vo when the voltage monitoring module outputs the HTL mode; when the normal working mode is adopted, the slope is not calculated, and the output keeps unchanged. The result Kslope of the slope calculation module is inputted to the mode control module.

The inputs of the mode control module are the mode output (mode_F) of the voltage monitoring module, the output Kslope of the slope calculation module and the calculation result $V_{PI}$ of the PID module respectively. When the output mode_F of the voltage monitoring module is the dynamic mode (LTH mode or HTL mode), the module switches off the PID module through outputting a control signal PI_ctrl, and controls the PWM module to receive the switching period $T_{s\_LTH}$ or $T_{s\_HTL}$ of the dynamic mode, and duty ratio $T_{on\_LTH}$ or $T_{on\_HTL}$ (or current) information outputted by the module, and the PWM module generates a duty ratio waveform at the moment according to the two signals; when the mode control module jumps out of the dynamic mode to enter a first switch period of the normal working mode, the mode control module obtains the size of a corresponding output load according to the size of the slope Kslope of the slope calculation module at the moment, the PID module is started through the control signal PI_ctrl and $V_{PI0}$ is assigned to the current sampling result before PID calculation, $V_{PI0}$ is the output value of the PID module corresponding to the load in a stable state after change, the PID module conducts PID calculation according to the error outputted by the error module after the assignment, and a PID calculation result $V_{PI}$ is fed back to the mode control module to conduct mode selection and control in the normal working mode; when the mode control module jumps out of the dynamic mode to enter a second switch period of the normal working mode and later, the control signal PI_ctrl is outputted to start the PID module to conduct calculation, the PID module conducts PID calculation according to the error outputted by the error module, the calculation result $V_{PI}$ is fed back to the mode control module to conduct mode selection and control in the normal working mode, the PWM module receives a supplementary result $V_{PI}$ outputted by the PID and the control mode (mode_ctrl) of the normal working mode given by the mode control module in the normal working mode, the switch period and the duty ratio (or current) information is obtained through calculation, and the PWM module generates the duty ratio waveform according to the two signals at the moment.

The inputs of the PID module are an error signal outputted by the error calculation module, the control signal PI_ctrl outputted by the mode control module and the $V_{PI0}$ assigned. In the dynamic mode, when the PID module is switched off by the control of PI_ctrl, the dynamic mode is switched to the first switch period of the normal working mode, an initial value $V_{PI0}$ is assigned to the calculation of the PID module firstly, then PID calculation is conducted, the supplementary calculation result $V_{PI}$ is inputted to the mode control module and the PWM module, then PID calculation is conducted to each period of the normal working mode, and the supplementary result $V_{PI}$ is inputted to the mode control module and the PWM module.

The PWM module selects whether to accept the switch period Ts_LTH or Ts_HTL and the duty ratio DLTH or DHTL (or current) information of the dynamic mode according to the control signal PI_ctrl outputted by the mode control module, or calculates to obtain the switch period and the duty ratio information during normal control through the supplementary result of the PID module or the mode signal mode_ctrl of the normal working mode given by the mode control module; after the period and the duty ratio (or peak current) information are obtained, the duty ratio waveform is outputted through a driving circuit to realize the loop control, so that the dynamic response of the switch power is improved through the dynamic control module when the load changes greatly; and then the output voltage of the switch power is sampled again, and the process above is repeated to conduct cycle control to switch on and off the power valve of the switch power, so as to make the system be more stable, thus obtaining higher dynamic response.

The sampling module comprises the sampling circuit and the sampling calculation module, the sampling circuit outputs a partial voltage through the switch power to obtain the information of the output voltage, and the sampling calculation module gives a control signal and the output voltage Vo of the sampling circuit according to the result of the sampling circuit. The sampling here can be direct sampling or indirect sampling, and the sampling result can be an analog quantity or digital quantity.

The dynamic control module comprises the voltage monitoring module and the slope calculation module.

The voltage monitoring module determines whether to adopt the dynamic mode according to the sampling result Vo, and the voltage monitoring module comprises three comparators and a logic unit to determine whether to adopt the dynamic mode. The three comparators determine the relationship between the sampling voltage Vo and the minimum voltage Vomin, the relationship between the sampling voltage Vo and the maximum voltage Vomax, and the relationship between the sampling voltage Vo and the reference voltage Vref respectively. The logic cell outputs a mode selection result according to the results of the comparators, wherein the output result mode_F of the logic cell is one of the HTL mode (mode_LTH), the LTH mode (mode_HTL) and the normal working mode (mode_normal); when Vo is greater than Vomax, the output mode_F is mode_HTL, i.e., the HTL mode is started, when Vo is less than Vomin, the output mode_F is mode_LTH, i.e., the LTH mode is started, and when Vo is between Vomin and Vref, if the output of the logical unit is the LTH mode in last period, then the output of the logical unit is the LTH mode in the period; if the output of the logical unit is the HTL mode in last period, then the output of the logical unit is the normal mode in the period; if the output of the logical unit is the normal mode in last period, then the output of the logical unit is the normal mode in the period; when Vo is between Vref and Vomax, if the output of the logical unit is the LTH mode in last period, then the output of the logical unit is the normal mode in the period; if the output of the logical unit is the HTL mode in last period, then the output of the logical unit is the HTL mode in the period; and if the output of the logical unit is the normal working mode in last period, then the output of the logical unit is the normal working mode in the period. The mode selection result is inputted to the slope calculation module and the mode control module in the dynamic modules.

The inputs of the slope calculation module are the sampling result Vo and the output mode_F of the voltage monitoring module, when the output is the LTH mode, the rising slope Kup of Vo is calculated, and the voltage changes of N1 LTH mode switch periods are used for equivalency replacement, i.e., Kup=Vo(n)−Vo(n−N1), wherein Vo(n) is the sampling result of the current period, Vo(n−N1) is the sampling result before N1 periods, and Kup is the size of Kslope outputted; when the output mode of the voltage monitoring module is the HTL mode, the descending slope Kdown of Vo is calculated, the voltage changes of N2 HTL mode switch periods are used for equivalency replacement, i.e., Kdown=Vo(n−N2)−Vo(n), wherein Kdown is the size of Kslope outputted; and when the output mode of the voltage monitoring module is the normal working mode, the module does not work, and the output result Kslope keeps unchanged through latching. The output result Kslope of the module is inputted to the mode control module.

The input of the error calculation module is the output Vo of the sampling circuit, and the difference of subtracting the output voltage Vo from the reference voltage Vref is the current sampling error, which is donated as e1, and inputted to the PID module.

The inputs of the mode control module are the output mode mode_F of the voltage monitoring module, and the output Kslope of the slope calculation module respectively. When the output mode (mode_F) of the voltage monitoring module is the LTH mode (mode_LTH), the module outputs a control signal PI_ctrl to the PID module and the PWM module; at the moment, the PI_ctrl switches off the PID module and controls a PWM module to receive the switching period $T_{s\_LTH}$ of the LTH mode, and duty ratio duty ratio DLTH (or current) outputted by the module, wherein PI_ctrl at this moment is donated as PI_off; when the output mode (mode_F) of the voltage monitoring module is the HTL mode (mode_HTL), the module outputs a control signal PI_ctrl to the PID module and the PWM module; at the moment, the PI_ctrl switches off the PID module and controls a PWM signal to receive the switching period Ts_HTL of the HTL mode, and duty ratio duty ratio DHTL (or current) outputted by the module, wherein PI_ctrl at this moment is donated as PI_off; when the output mode (mode_F) of the voltage monitoring module is the normal working mode (mode_normal), if the output in last switch period is the LTH mode or HTL mode, the module outputs a control signal PI_ctrl which is inputted to the PID module and the PWM module, and PI_ctrl at this moment is donated as PI_set; the PID module is started to assign the calculation result of the PID module, wherein the assignment $V_{PI0}$ is obtained by firstly calculating the load via mode_F and Kslope through conservation of energy and then calculating according to the normal working mode, then PID calculation is conducted, and the PWM module is controlled to receive a PI calculation result, and receive the mode selection result (mode_ctrl) of the normal working mode conducted by $V_{PI}$ according to the PI calculation result and input the result to the PID module and the PWM module; if the output mode (mode_F) of the voltage monitoring module in last switch period is the normal working mode (mode_normal), the module outputs the control signal PI_ctrl which is inputted to the PID module and the PWM module, and PI_ctrl at this moment is recorded PI_on; the PID module is started to conduct PID calculation, and the PWM module is controlled to receive the supplementary result of the PID module, and receive the control of the normal working mode conducted by $V_{PI}$ according to $V_{PI}$ and input the mode selection result (mode_ctrl) of the normal working mode to a PID parameter selection module and the PWM module.

The PID module comprises a PID calculation function and a PID parameter selection function, and the PID module works under the control of the control signal (PI_ctrl) outputted by the mode control module and the mode selection result (mode_ctrl) of the normal working mode; when PI_ctrl is PI_off, the PID module is switched off; when PI_ctrl is PI_set, after $V_{PI}$ is assigned with the $V_{PI0}$ outputted by the mode control module, PID calculation parameters comprising a proportion parameter $K_p$, an integral parameter $K_i$ and a differential parameter $K_d$ are selected according to the mode selection result (mode_ctrl) of the normal working mode, to conduct PID calculation; when PI_set is PI_on, PID parameters comprising the proportion parameter $K_p$, the integral parameter $K_i$ and the differential parameter $K_d$ are selected according to the mode selection result (mode_ctrl) of the normal working mode, to conduct PID calculation, wherein the supplementary result $V_{PI}$ is inputted to the mode control module and the PWM module.

The inputs of the PWM module are the control signal PI_ctrl outputted by the mode control module, the switch period $T_{s\_LTH}$ or $T_{s\_HTL}$ and the duty ratio $D_{LTH}$ or $D_{HTL}$ of the LTH and HTL modes, the mode selection result (mode_ctrl) signal of the normal working mode, and the supplementary result $V_{PI}$ of the PID module. when PI_ctrl is PI_off, the switch periods and duty ratios (or peak current) of the LTH and HTL modes outputted by the mode control module are received; when PI_ctrl is PI_set or PI_on, the mode selection result (mode_ctrl) of the normal working mode outputted by the mode control module and the supplementary result $V_{PI}$ of the PID module are received, and a rational method is selected according to the mode_ctrl result to obtain the switch period and duty ratio (or peak current) of the normal mode by $V_{PI}$ calculation; after the period and the duty ratio (or peak current) information are obtained, the duty ratio waveform is obtained, and the output of a PWM unit is connected to a driving circuit, a circuit with less delay time is selected as the driving circuit as far as possible, and the output of the driving circuit is connected to the grid of a power valve of the switch power.

Figure 2:
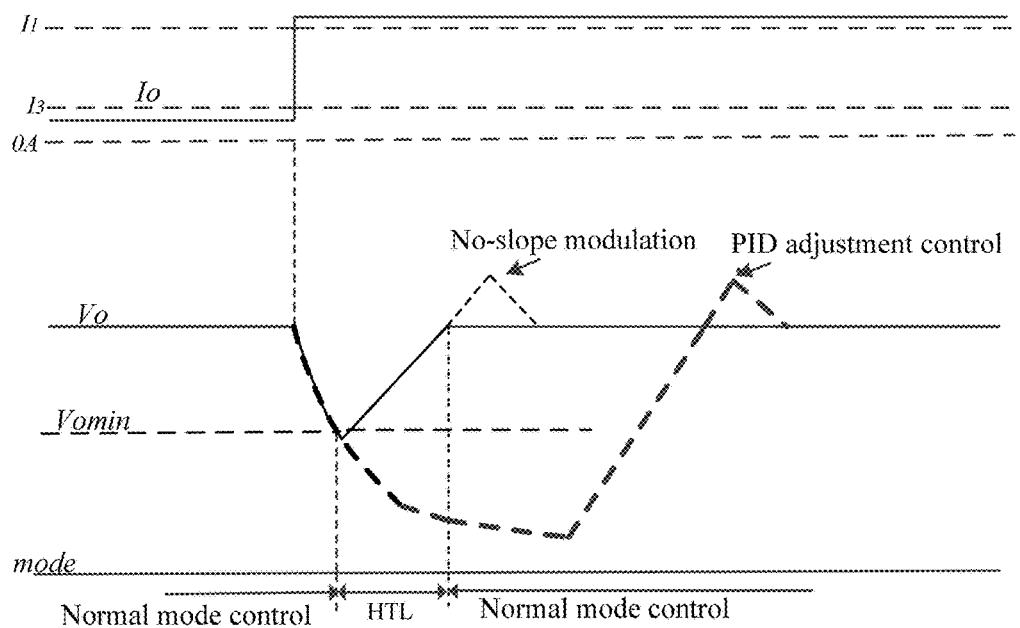
FIG. 2 is an application diagram of a heavy-to-light load HLT mode.

Referring to FIG. 2, when switching from a light load to a heavy load, it can be seen from the figure that the LTH mode is adopted when the output voltage is less than Vomin. If PID adjustment is adopted, which is as shown in the thick dotted line, the voltage will drop still after the output voltage drops to Vomin, and the dynamic recovery time is also very long. When adopting the LTH mode, the LTH mode is immediately adopted when the output voltage is less than Vomin. Because the energy of the mode is greater than the energy during full load generally, the output voltage starts rising immediately and will not drop any longer; before the output voltage rises to a stable value, this is the fast dynamic method; when the output voltage is the same as the stable voltage, the size of the output load can be obtained through the slope, so that the energy of the working mode jumping out of the LTH mode can be close to the power consumption of the load, to eliminate subsequent resonance introduced by unmatched energy, which is as shown in the full line; it can be seen that after jumping out of the LTH mode, if the working state starts from full load, the input energy thereof is too large, which introduces voltage resonance, as shown in the fine dotted line.

Figure 3:
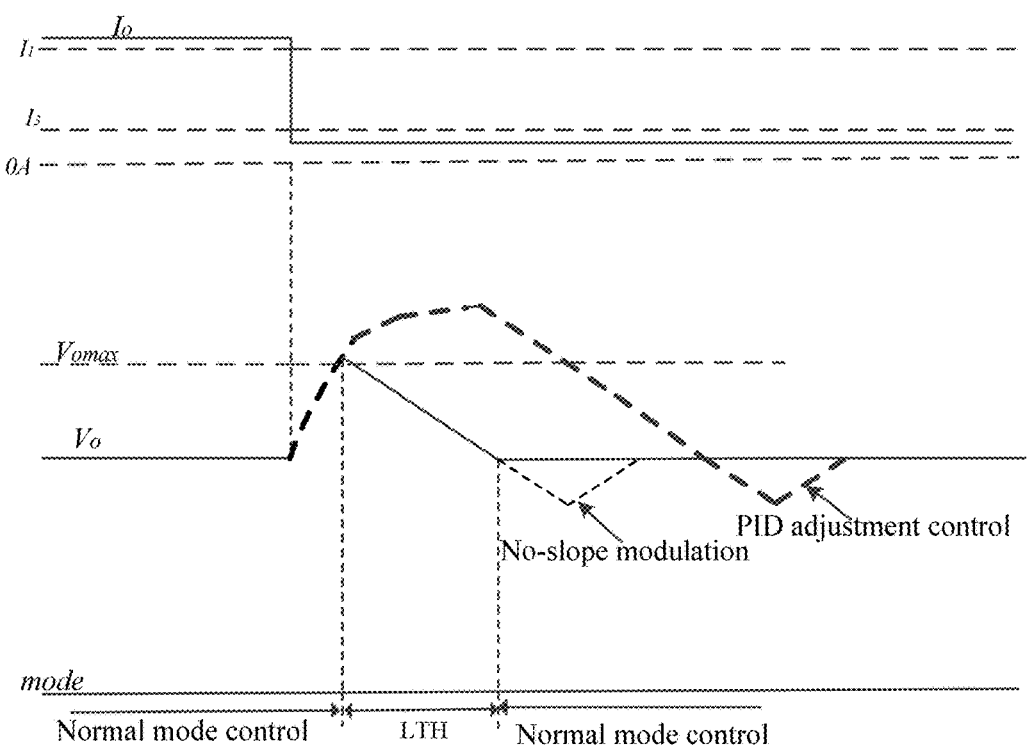
FIG. 3 is an application diagram of a light-to-heavy load LTH mode.

Referring to FIG. 3, when switching from a heavy load to a light load, it can be seen from the figure that the HTL mode is adopted when the output voltage is greater than Vomax. If PID adjustment is adopted, which is as shown in the thick dotted line, the voltage will rise still after the output voltage rises to Vomax, and the dynamic recovery time is also very long. When adopting the HTL mode, the HTL mode is immediately adopted when the output voltage is greater than Vomax. Because the power input of the mode is less than a standby power generally, the output voltage starts dropping immediately and will not rise any longer; before the output voltage drops to a stable value, this is the fast dynamic method; when the output voltage is the same as the stable voltage, the size of the output load can be obtained through the slope, so that the energy of the working mode jumping out of the HTL mode can be close to the power consumption of the load, to eliminate subsequent resonance introduced by unmatched energy, which is as shown in the full line; it be seen that after jumping out of the HTL mode, if the working state starts from the standby state, the input energy thereof is too small, which introduces voltage resonance, as shown in the fine dotted line.

Figure 4A:
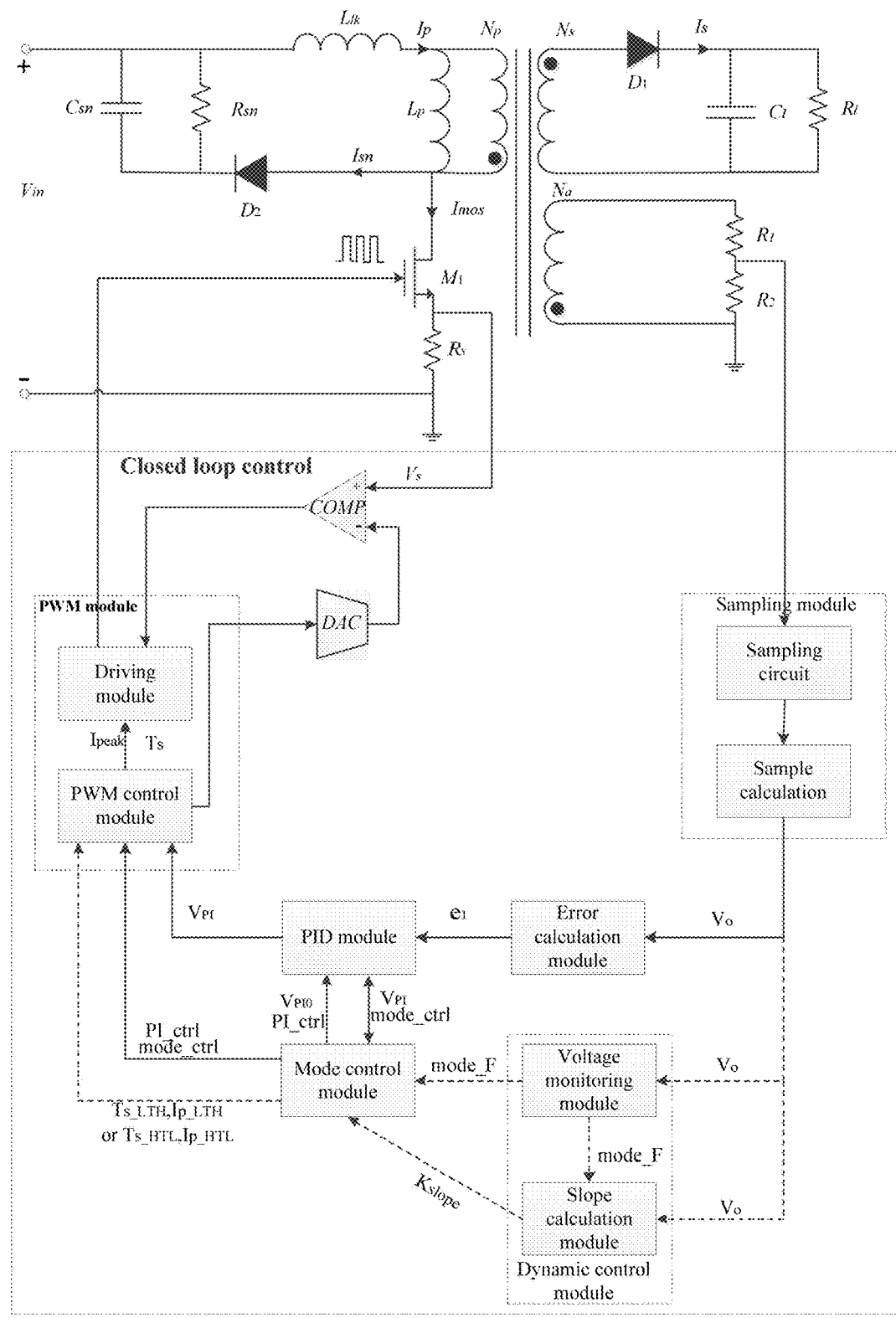
FIG. 4a is a structure drawing embodiment of a closed-loop circuit having a multi-mode control flyback converter according to the present invention.

FIG. 4a is an embodiment of using a flyback circuit as an object. The method and system used in the present invention are also applicable to other types of switch power circuit structures. A flyback circuit with primary feedback is taken as an example herein. The input of the flyback converter example is 90-265V, the output thereof is 5V, the maximum current thereof is 1 A, the inductance size thereof is 1.6 mH, the turn ratio of a transformer thereof is 104/6, and the flyback converter outputs a constant voltage. A DCM control method is adopted in the converter to realize digital control by a multi-mode control method. The working modes of the existing circuits under different loads are given below. Based on this mode, the working method of optimizing the dynamic performance in this example is added.

Figure 4B:
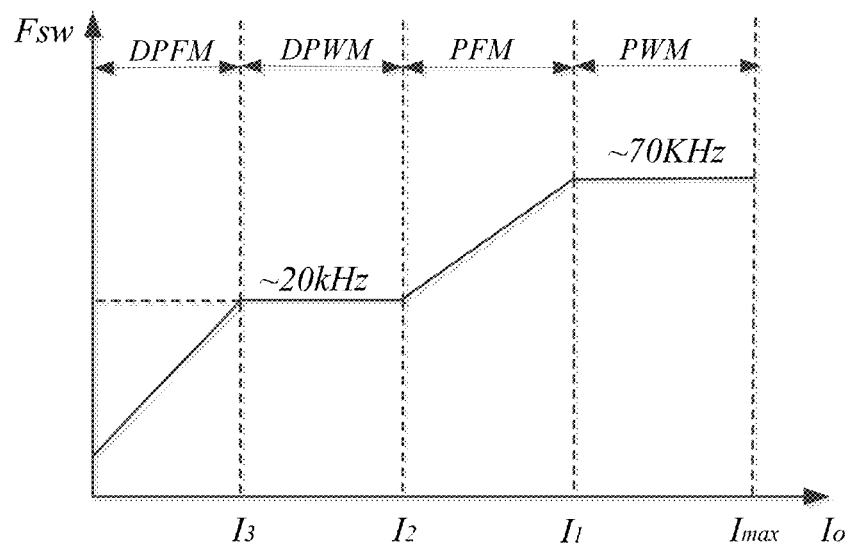
FIG. 4b is a relationship between a switch frequency and a load current when a flyback system is working in a normal working mode under a steady-state.
Figure 5A:
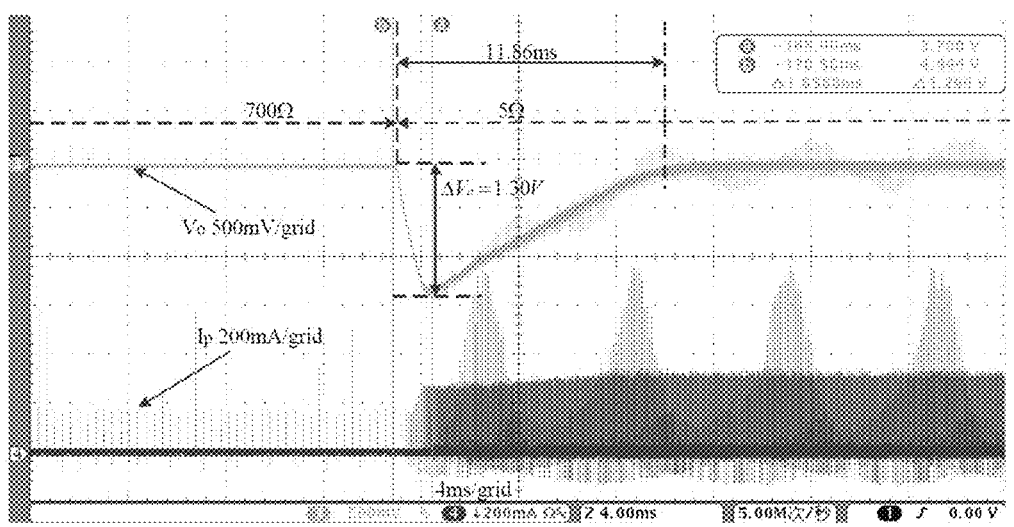
FIG. 5a is a dynamic result of switching the load from 700Ω to 5Ω before using the dynamic improving method herein for a dynamic response curve of a flyback circuit in FIG. 4 under multi-mode control during load switching.
Figure 5B:
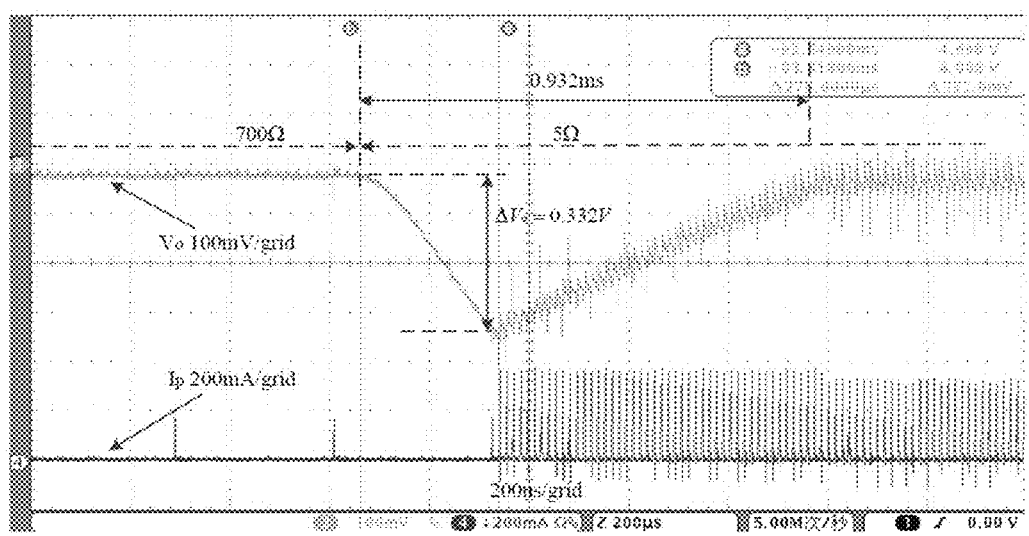
FIG. 5b is a dynamic result of switching the load from 700Ω to 5Ω after using the dynamic improving method herein for a dynamic response curve of a flyback circuit in FIG. 4 under multi-mode control during load switching.
Figure 5C:
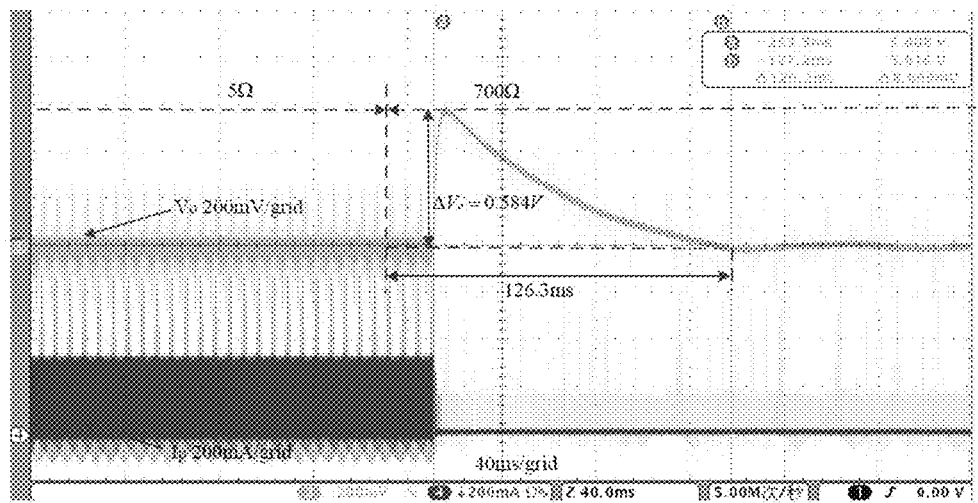
FIG. 5c is a dynamic result of switching the load from 5Ω to 700Ω before using the dynamic improving method herein for a dynamic response curve of a flyback circuit in FIG. 4 under multi-mode control during load switching.
Figure 5D:
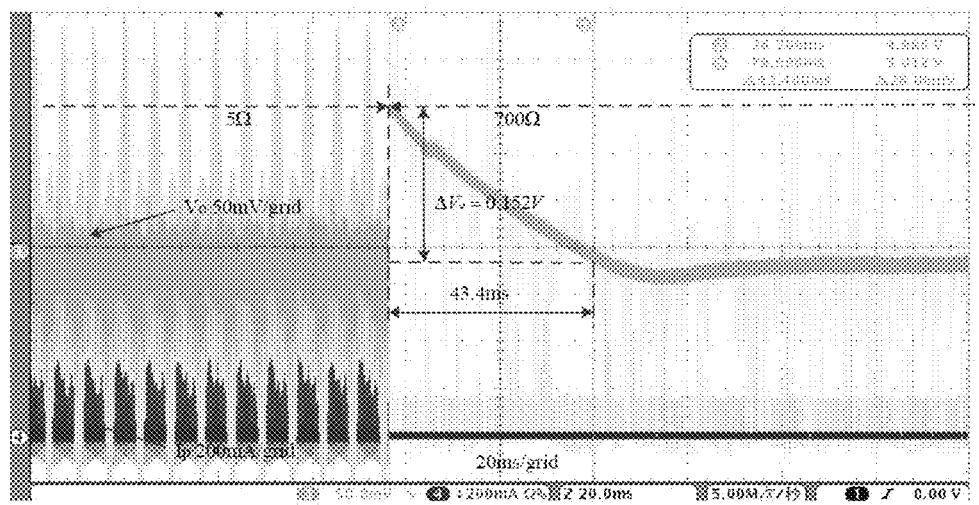
FIG. 5d is a dynamic result of switching the load from 5Ω to 700Ω after using the dynamic improving method herein for a dynamic response curve of a flyback circuit in FIG. 4 under multi-mode control during load switching.

The control method of the mode from a light load to a heavy load is DPFM-DPWM-PFM-PWM, which is as shown in FIG. 4b. Multi-mode working methods are respectively defined below. It is defined that a 1 A load is a load A which is full load namely, a switch frequency $f_A$ is 70 kHz, the circuit has higher efficiency, a 0.7 A load is a load B, a switch frequency $f_B$ is 70 kHz, a 0.2 A load is a load C, a switch frequency $f_C$ is 20 kHz, a 0.05 A load is a load D and a switch frequency $f_D$ is 20 kHz, and the switch frequency at the load point is selected according to the system efficiency requirements. When the load is between A and B, a PWM mode is adopted, and the switch frequency is 70 kHz; when the load is between B and C, a PFM mode is adopted, and the primary peak current is 0.255 A; When the load is between C and D, a DPWM mode is adopted and denoted as the DPWM mode, and the switch frequency is 20 kHz; when the load is less than the load D, a PWM mode is adopted and denoted as the DPFM mode, and the primary peak current is 0.151 A. The working mode of the load from light to heavy is DPFM-DPWM-PFM-PWM. The dummy load during standby here is 700Ω, the circuit works in the DPFM mode during standby, the primary peak current is 0.151 A, and the switch frequency is 3 kHz; when the full load is 5Ω, the primary peak current is 0.365 A, and the switch frequency is 70 kHz.

When defining the light-to-heavy load mode (LTH), in order to ensure that the output can rise to a target voltage rapidly when switching from a light load to a heavy load under any case, the power input of LTH needs to be as big as possible, and the power input needs to be constant; therefore, the mode is a control method with constant period and constant primary peak current. In order to increase the voltage rising speed, there are two ways to increase the input power in this mode. The first method is that the frequency is the same as the 70 kHz PWM mode, and the peak current should be as large as possible, but it needs to ensure that the system needs to work in a DCM (discontinuous conduction modulation) mode, and there is a certain allowance of time for calculation; and this condition needs to be given under the condition of minimum input voltage; the second method is that is a larger primary peak current is taken when the input voltage is minimum, which is generally greater than or equal to the peak current during full load, and the switch frequency is improved in case of meeting the requirements of the working and computing allowance of DCM. This embodiment takes the first method as an example, taking the primary peak current as 0.4 A and the switch periods as 70 kHz. When defining the heavy-to-light load mode (HTL), in order to ensure that the output can drop to a target voltage rapidly when switching from a heavy load to a light load under any case, the power input of switching from the heavy load to the light load needs to be as small as possible, and the power input needs to be constant; therefore, the mode is a control method with constant period and constant primary peak current. In order to increase the voltage dropping speed, it is necessary to reduce the input power in this mode to be less than the standby power consumption. There are generally two methods. The first method is that the primary current is the same as the DPFM mode and the switching frequency is as low as possible, but it needs to ensure that when the system samples from an auxiliary winding, the waveform of the auxiliary winding will not be caused due to that an RCD clamping voltage is too low, making a larger error to the sampling of the output voltage; and this condition needs to ensure that the clamping voltage of an RCD circuit at this time is high enough. The second method is that the primary peak current is less than the peak current of the DPFM, and the switch frequency is reduced as far as possible in the meanwhile; and this method also requires that the clamping voltage of the RCD circuit during full load is high enough, so that sampling can be accurate during light load. The heavy-to-light load mode in the embodiment takes the first method as an example, taking the primary peak current as 0.151 A and the switch periods as 2 kHz.

According to the equation $$\begin{cases} \frac{1}{2}L_p(I_{p\_LTH})^2\eta = V(n)I_o(n)T_{LTH} + \frac{1}{2}C(V(n)^2 - V(n-1)^2) \\ K_{np} = V(n) - V(n-5) \end{cases},$$

the primary inductance Lp=1.6 mH, the primary peak current of the LTH mode is $I_{p\_LTH}$=0.4 A, the switch period is that $T_{LTH}$=14.3 us, η is the system efficiency which is 0.8, and $I_o(n)$ is an output load current. In order to decrease the error of the rising slope, the value of subtracting the sampling result V(n−5) before five periods from the sampling result V(n) of the current period is taken as the size of the slope, and it can be obtained that when switching from light load to heavy load, the LTH is invoked, and the relationship between the output load and the corresponding working state thereof and the slope is table 1; therefore, for example, when switching from light load to heavy load (7Ω), the output jumps out of the LTH mode and enters the PFM mode when the output voltage reaches 5V, the initial working state is 350 $T_s$/clk (57 kHz), and the primary peak current is 0.286 A; in this way, large ripple waves will not be introduced by the output. The output voltage is sampled digitally. The digital quantity corresponding to 5V is 583, and Kup is calculated by the digital quantity.

TABLE 1

| $K_{up}$ | Load | Mode | $T_s$/clk | $I_P$/A |
| --- | --- | --- | --- | --- |
| 0-3 | 5 Ω | PWM | 286 | 0.363 |
| 4-5 | 6 Ω | PWM | 286 | 0.286 |
| 6 | 7 Ω | PFM | 350 | 0.286 |
| 7 | 10-12 Ω | PFM | 513 | 0.286 |
| 8 | 12-15 Ω | PFM | 602 | 0.286 |
| 9 | 15-20 Ω | PFM | 961 | 0.286 |
| 10- | 20 Ω- | DPWM | 1000 | 0.231 |

According to the equation $$\begin{cases} \frac{1}{2}L_p(I_{p\_LTH})^2\eta = V(n)I_o(n)T_{LTH} + \frac{1}{2}C(V(n)^2 - V(n-1)^2) \\ K_{np} = V(n-3) - V(n) \end{cases},$$

the primary inductance of the HTL mode is that $I_{p\_HTL}$=0.141 A, the switch period is that $T_{HTL}$=500 us, η is the system efficiency which is 0.6, and $I_o(n)$ is an output load current. In order to decrease the error of the descending slope, the value of subtracting the sampling result V(n) from the sampling result V(n−5) before five periods is taken as the size of the slope, and it can be obtained that when switching from heavy load to light load, the HTL is invoked, and the relationship between the output load and the corresponding working state thereof and the slope is table 2; therefore, for example, when switching from heavy load to small load (500Ω), the output jumps out of the HTL mode and enters the DPFM mode when the output voltage reaches 5V, the initial working state is 4330 $T_s$/clk (4.62 kHz), and the primary peak current is 0.151 A; in this way, large ripple waves will not be introduced by the output. The output voltage is sampled digitally. The digital quantity corresponding to 5V is 583, and Kdown is calculated by the digital quantity.

TABLE 2

| $K_{down}$ | Load | Mode | $T_s$/clk | $I_{peak}$/A |
| --- | --- | --- | --- | --- |
| 0-1 | 500-700 Ω | DPFM | 5650 | 0.151 |
| 2 | 400-500 Ω | DPFM | 4330 | 0.151 |
| 3-4 | 200-400 Ω | DPFM | 1690 | 0.151 |
| 5-6 | 120-200 Ω | DPWM | 1000 | 0.151 |
| 7- | -120 Ω | DPWM | 1000 | 0.192 |

The above are the specific parameters of the design example of the flyback power (5V, 1 A) with primary feedback.

FIG. 5 is a dynamic response curve of the general multi-mode control method of the present invention for the flyback circuit in FIG. 4 during load switching, and a dynamic response curve adopting the technology for improving the dynamic response herein. This is the embodiment of the present invention. FIG. 5a is a dynamic result of switching the load from 700Ω to 5Ω before using the dynamic improving method herein, and FIG. 5b is a dynamic result of switching the load from 700Ω to 5Ω after using the dynamic improving method herein. Before using the technology, the undervoltage of the output voltage is 1.3V and the recovery time is 11.86 ms; after using the technology, the undervoltage of the output voltage is 0.332V and the recovery time is 0.932 ms, and the dynamic performances are greatly improved. FIG. 5c a dynamic result of switching the load from 5Ω to 700Ω before using the dynamic improving method herein, and FIG. 5d is a dynamic result of switching the load from 5Ω to 700Ω after using the dynamic improving method herein. Before using the technology, the overvoltage of the output voltage is 0.584V and the recovery time is 126.3 ms; after using the technology, the using the technology, the undervoltage of the output voltage is 1.3V and the recovery time is 11.86 ms; after using the technology, the overvoltage of the output voltage is 0.152V and the recovery time is 43.4 ms, and the dynamic performances are greatly improved. The dynamic results of the example are greatly improved.

Figure 6A:
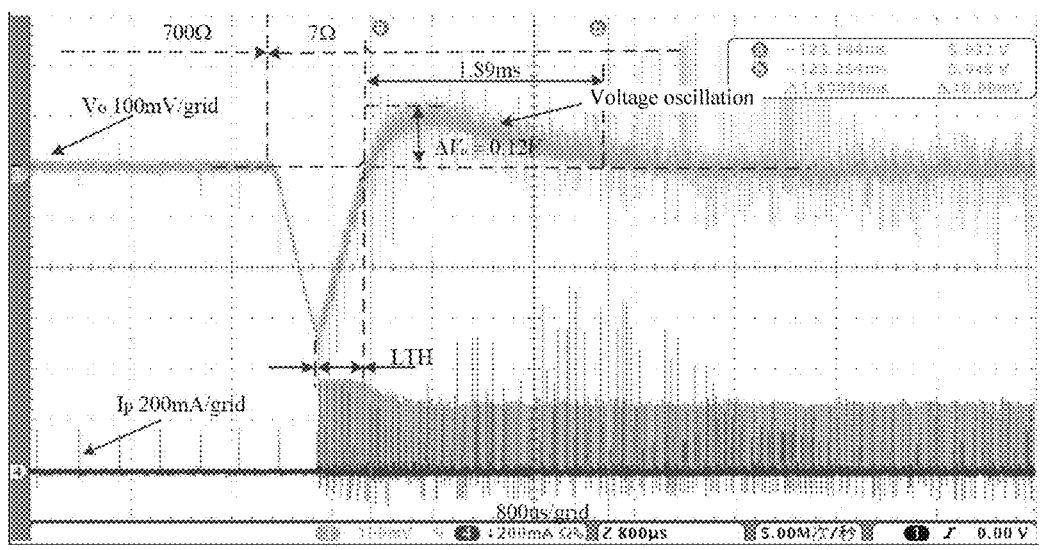
FIG. 6a is a dynamic effect when an initial working state is fixed at full load for a flyback circuit to FIG. 4, when the control method jumps out of the LTH mode.
Figure 6B:
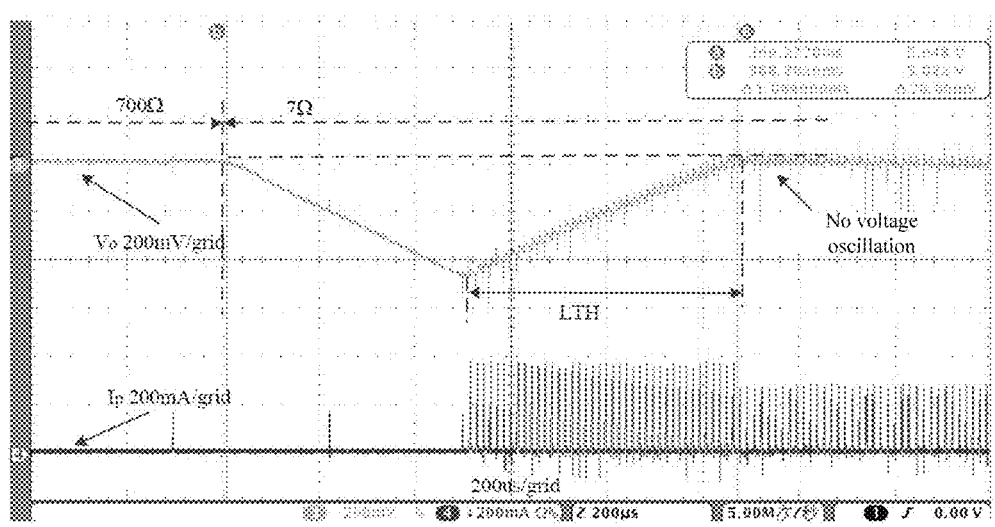
FIG. 6b is a dynamic effect of determining the initial working state by using a slope Kup for a flyback circuit to FIG. 4, when the control method jumps out of the LTH mode.

FIG. 6 is a comparison between the working state fixed with full load and the working state determined by the slope Kup to the flyback circuit in FIG. 4 when jumping out of the LTH mode; and this is the embodiment of the present invention. It can be seen that when the load is switched from 700Ω to 7Ω, when the system output reaches 5V and jumps out of the LTH mode, adjustment is started in FIG. 6a by using the working state under full load; at this moment, the power input is greater than the load consumption, and the output voltage will rise, which introduces voltage oscillation; in FIG. 6b, when jumping out of the LTH mode, Kup is 6, and the corresponding load is around 7Ω; at this moment, the working state starts from 350 $T_s$/clk (57 kHz) and the primary peak current of 0.286 A of the PFM mode, which will not introduce voltage oscillation; at this moment, it can be deemed that the output voltage is already stable, the subsequent resonance voltage is eliminated, and the recovery time of the dynamic process is decreased.

Figure 7A:
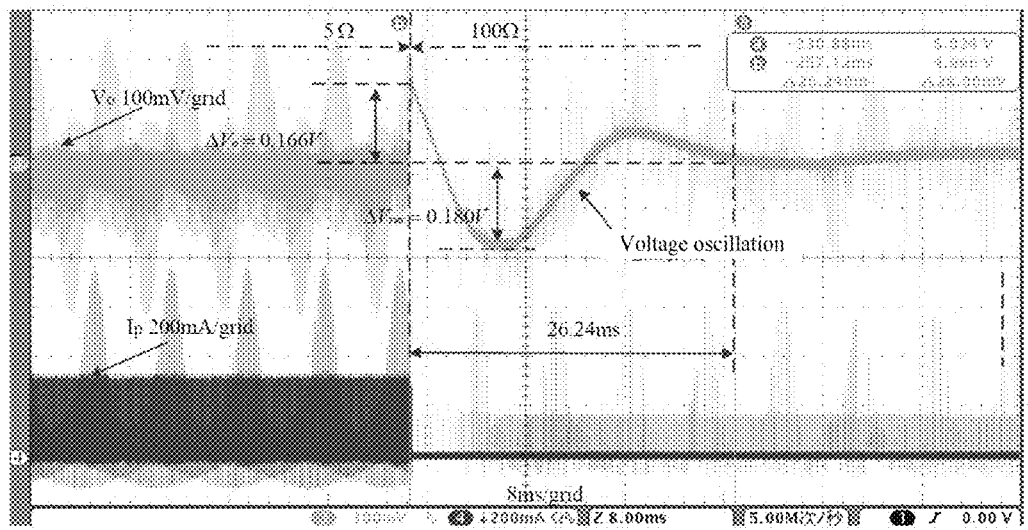
FIG. 7a is a dynamic effect when the initial working state is standby for a flyback circuit to FIG. 4, when the control method jumps out of the HLT mode.
Figure 7B:
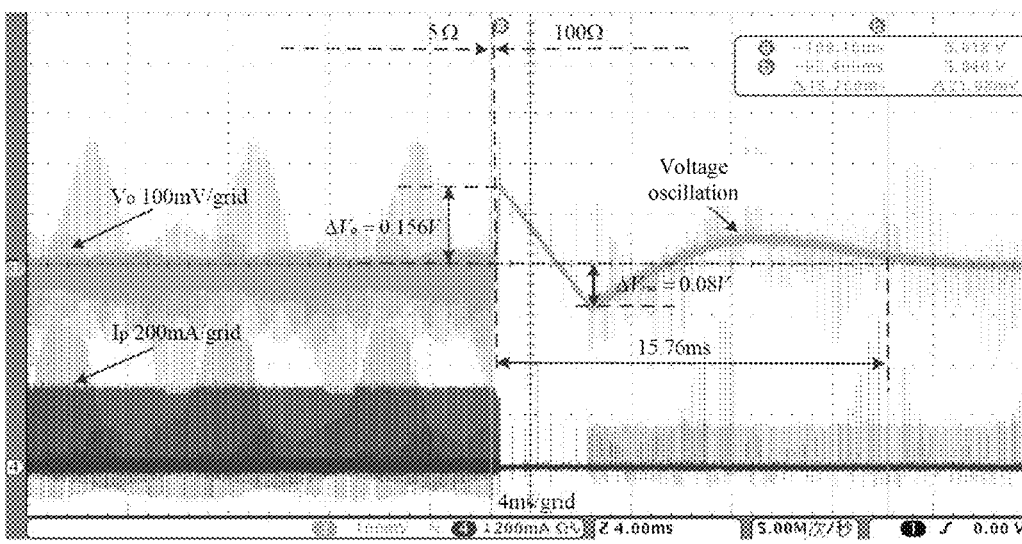
FIG. 7b is a dynamic effect of determining the initial working state by using a slope Kdown for a flyback circuit to FIG. 4, when the control method jumps out of the HLT mode.

FIG. 7 is a comparison between the working state fixed to be standby and the working state determined by the slope Kdown to the flyback circuit in FIG. 4 when jumping out of the HLT mode; and this is the embodiment of the present invention. It be seen that when the load is switched from 5Ω to 100Ω, when the system output reaches 5V and jumps out of the HTL mode, adjustment is started in FIG. 7a by using the standby working state; at this moment, the power input is less than the load consumption, and the output voltage will drop, which introduces voltage oscillation; in FIG. 7b, when jumping out of the HTL mode, Kdown is 7, and the corresponding load is around 100Ω; at this moment, the working state starts from 1000 $T_s$/clk (20 kHz) and the primary peak current of 0.151 A of the DPWM mode, which will not introduce voltage oscillation; at this moment, it can be deemed that the output voltage is already stable, the subsequent resonance voltage is eliminated, and the recovery time of the dynamic process is decreased.

It can be seen from the example above that the dynamic performances of the multi-mode control system are greatly improved in particular by adopting the method herein.

The contents above are further detailed descriptions of the invention in conjunction with specific preferred embodiments. It cannot be determined that the specific implementation of the invention is limited to these descriptions. The invention described herein may have many variations (the slope may be equivalent to the time length), and these variations cannot be artificially deviated from the spirit and scope of the invention. Accordingly, all modifications as apparent to those skilled in the art are covered by the claims.

What is claimed is:

1. A control method for improving dynamic response of switch power, wherein the control method is based on a control system comprising a sampling module, a dynamic control module, an error calculation module, a PID module, a mode control module, and a PWM module, and the control system is connected to the controlled switch power to form a closed loop;

the sampling module comprises a sampling circuit and a sampling calculation module, the sampling circuit outputs a partial voltage through the switch power to obtain the information of the output voltage, and the sampling calculation module calculates the output voltage as Vo according to the result of the sampling circuit;

the dynamic control module comprises a voltage monitoring module and a slope calculation module; the voltage monitoring module receives the sampling result of the output voltage Vo outputted by the sampling module and determines whether to adopt a dynamic mode according to the relationship between Vo and a set maximum voltage Vomax, a set minimum voltage Vomin, and a reference voltage Vref respectively, wherein Vomin<Vref<Vomax; the dynamic mode means that when the output voltage Vo changes greatly, the output voltage Vo is rapidly restored to a stable voltage by inputting large power or small power, and the dynamic mode comprises a constant-frequency light-to-heavy load LTH mode and a constant-frequency heavy-to-light load HTL mode;

the voltage monitoring module outputs a mode selection result mode_F to the mode control module and the slope calculation module, if the voltage monitoring module determines that the system enters the dynamic mode, the slope calculation module calculates a voltage change slope; if the system enters a normal working mode, output latch of the slope calculation module is controlled to be unchanged; the slope calculation module calculates the rising slope of Vo when the voltage monitoring module outputs the LTH mode, and calculates the descending slope of Vo when the voltage monitoring module outputs the HTL mode; when the normal working mode is adopted, the slope calculation module does not calculate the slope, and the slope Kslope keeps unchanged; and the result Kslope of the slope calculation module is outputted to the mode control module;

the voltage monitoring module comprises three comparators COMP1, COMP2 and COMP3, and a logical unit, the positive terminal of the comparator COMP1 is connected to the set maximum Vo Vomax, and the negative terminal of the comparator COMP1 is connected to Vo; the positive terminal of the comparator COMP2 is connected to Vo, and the negative terminal of the comparator COMP2 is connected to the set reference voltage Vref; the positive terminal of the comparator COMP3 is connected to Vo, the negative terminal of the comparator COMP3 is connected to the set minimum voltage Vomin, and the logical unit outputs one of the LTH mode, the HTL mode and the normal mode according to the results of the three comparators;

when Vo is less than the minimum voltage Vomin, the logical unit outputs the constant-frequency light-to-heavy load LTH mode in the dynamic mode to enable the output to be rapidly raised to the reference voltage Vref by inputting large power and then jump out of the mode and enter the normal mode, and the initial state of the normal mode is set by the mode control module;

when Vo is greater than the maximum voltage Vomax, the logical unit outputs the constant-frequency heavy-to-light load HTL in the dynamic mode to enable the output to be rapidly dropped to the reference voltage Vref by inputting small power and then jump out of the mode and enter the normal mode, and the initial state of the normal mode is set by the mode control module;

if Vo does not change greatly, the dynamic mode is not needed, and loop control is realized through normal PI control method and mode control, which is called normal working mode;

when Vo is between Vomin and Vref, if the output of the logical unit is the LTH mode in last period, then the output of the logical unit is the LTH mode in the period; if the output of the logical unit is the HTL mode in last period, then the output of the logical unit is the normal mode in the period; if the output of the logical unit is the normal mode in last period, then the output of the logical unit is the normal mode in the period; when Vo is between Vref and Vomax, if the output of the logical unit is the LTH mode in last period, then the output of the logical unit is the normal mode in the period; if the output of the logical unit is the HTL mode in last period, then the output of the logical unit is the HTL mode in the period; and if the output of the logical unit is the normal mode in last period, then the output of the logical unit is the normal mode in the period;

the inputs of the slope calculation module are the sampling result Vo and the output mode_F of the voltage monitoring module, when the mode_F is the LTH mode, the rising slope Kup of Vo is calculated, and the voltage changes of N1 LTH mode switch periods are used for equivalency replacement, i.e., Kup=Vo(n)−Vo(n−N1), wherein Vo(n) is the sampling result of the current period, Vo(n−N1) is the sampling result before N1 periods, and Kup is the size of the result Kslope outputted from the slope calculation module; when the mode_F is the HTL mode, the descending slope Kdown of Vo is calculated, the voltage changes of N2 HTL mode switch periods are used for equivalency replacement, i.e., Kdown=Vo(n−N2)−Vo(n), wherein Kdown is the size of Kslope outputted; and when the mode_F is the normal mode, the slope calculation module does not work, and the output result Kslope keeps unchanged through latching;

the input of the error calculation module is the output Vo of the sampling module, and the difference of subtracting the output voltage Vo from the reference voltage Vref is the current sampling error, which is donated as e1, and outputted to the PID module;

the inputs of the mode control module are the output mode_F of the voltage monitoring module, the output Kslope of the slope calculation module and the calculation result $V_{PI}$ of the PID module respectively; when the output mode_F of the voltage monitoring module is the dynamic mode, the mode control module switches off the PID module through outputting a control signal PI_ctrl, and controls the PWM module to receive the switching period $T_{s\_LTH}$ or $T_{s\_HTL}$ of the dynamic mode and duty ratio $D_{LTH}$/current or $D_{HTL}$/current information outputted by the mode control module, and the PWM module generates a duty ratio waveform at the moment according to the $T_{s\_LTH}$ or $T_{s\_HTL}$ of the dynamic mode, and the duty ratio $D_{LTH}$/current or $D_{HTL}$/current information; when the mode control module jumps out of the dynamic mode to enter a first switch period of the normal working mode, the mode control module obtains the size of a corresponding output load according to the size of the slope Kslope of the slope calculation module at the moment, the PID module is started through the control signal PI_ctrl and $V_{PI0}$ is assigned to the current sampling result before PID calculation, $V_{PI0}$ is the output value of the PID module corresponding to the load in a stable state after change, the PID module conducts PID calculation according to the error outputted by the error calculation module after the assignment, and a PID calculation result $V_{PI}$ is fed back to the mode control module to conduct mode selection and control in the normal working mode; when the mode control module jumps out of the dynamic mode to enter a second switch period of the normal working mode and later, the PID module is started by PI_ctrl to conduct calculation, the PID module conducts PID calculation according to the error outputted by the error module, the calculation result $V_{PI}$ is fed back to the mode control module to conduct mode selection and control in the normal working mode, the PWM module receives a supplementary result $V_{PI}$ outputted by the PID and the control mode of the normal working mode given by the mode control module in the normal working mode, the control mode is donated as mode_ctrl, the switch period and the duty ratio/current information is obtained through calculation, and the PWM module generates the duty ratio waveform according to the switch period and a duty ratio signal at the moment;

the inputs of the PID module are an error signal e1 outputted by the error calculation module, the control signal PI_ctrl outputted by the mode control module and the $V_{PI0}$ assigned; in the dynamic mode, when the PID module is switched off, the dynamic mode is switched to the first switch period of the normal working mode, an initial value $V_{PI0}$ is assigned to the calculation of the PID module firstly, then PID calculation is conducted, the supplementary calculation result VPI is outputted to the mode control module and the PWM module, then PID calculation is conducted to each period of the normal working mode, and the supplementary result $V_{PI}$ is outputted to the mode control module and the PWM module; and the inputs of the PWM module are the PI_ctrl control signal outputted by the mode control module, the switch period $T_{s\_LTH}$ or $T_{s\_HTL}$ and the duty ratio $D_{LTH}$ or $D_{HTL}$ of the LTH and HTL modes, the control mode result mode_ctrl of the mode control module in the normal working mode, and the supplementary result $V_{PI}$ of the PID module; the switch period and the duty ratio information in normal control are obtained by calculating through the supplementary result $V_{PI}$ of the PID module and a control mode mode_ctrl signal of the normal working mode given by the mode control module, after the period and the duty ratio/peak current information are obtained, the duty ratio waveform is outputted through a driving circuit to realize the loop control on the grid of a power valve of the switch power; and then the output voltage of the switch power is sampled again, and the process above is repeated to conduct cycle control to switch on and off the power valve of the switch power, so as to make the system be more stable, thus obtaining higher dynamic response.

\* \* \* \* \*